United States Patent [19]
Wood

[11] Patent Number: 5,274,952
[45] Date of Patent: Jan. 4, 1994

[54] BONSAI TRAINING PLANTER

[76] Inventor: Vance C. Wood, 16090 Wellington, Roseville, Mich. 48066

[21] Appl. No.: 959,293

[22] Filed: Oct. 9, 1992

Related U.S. Application Data

[63] Continuation-in-part of Ser. No. 874,625, Apr. 27, 1992.

[51] Int. Cl.$^5$ .............................................. A01G 9/02
[52] U.S. Cl. ......................................................... 47/66
[58] Field of Search .............................. 47/66, 78, 73

[56] References Cited

U.S. PATENT DOCUMENTS

| | | | |
|---|---|---|---|
| 1,689,017 | 10/1928 | Fewkes | 47/78 |
| 2,252,073 | 8/1941 | Gray | 47/73 |
| 3,184,890 | 5/1965 | McKey | 47/73 |
| 3,781,183 | 12/1973 | Doll | 47/78 |
| 4,154,022 | 5/1979 | Costanzo | 47/73 |
| 4,497,132 | 2/1985 | Whitcomb | |
| 4,716,680 | 1/1988 | Whitcomb et al. | 47/73 |

FOREIGN PATENT DOCUMENTS

| | | | |
|---|---|---|---|
| 1061564 | 9/1979 | Canada | 47/78 |
| 2464639 | 4/1981 | France | 47/78 |
| 1187620 | 4/1970 | United Kingdom | 47/78 |
| 1472192 | 5/1977 | United Kingdom | 47/78 |

OTHER PUBLICATIONS

Bonsai Creation Techniques: Black Pine From Seed (pp. 39-50) and How to Obtain a Cascade Style Pine From Seed (pp. 51-56) both by Kusida Matsuo, *Bonsai Today* No. 20, Jul. Aug. 1992 Issue.

*Primary Examiner*—Terry Lee Melius
*Assistant Examiner*—Joanne C. Downs
*Attorney, Agent, or Firm*—Peter D. Keefe

[57] ABSTRACT

A bonsai training planter structured in the form of a screen walled plant container covered with a sheet material having a preselected opacity. It is preferred that the corners thereof be provided with structural members to which screening is attached. The mesh size of the screening is small enough to hold soil placed within the planter, but large enough to permit roots to grow therethrough. The sheet material is placed over the screening in order to provide a low light environment at and near the screening which is conducive to auxin production. In operation, a seed or seedling is placed in the soil of the bonsai training planter. As dominant roots grow, they reach the screening and then commence to emerge therefrom into air. The portions of the dominant root emerging from the screening dry-out and die. The death of the emergent portion of the dominant root send auxins up the root, thereby inducing feeder root growth along the dominant root. The method according to the present invention continually repeats so as to result in development of a very complex system of feeder roots; the bonsai artist pruning branches in the usual way thereduring. The plant will develop into a bonsai in minimal time with minimal effort on the part of the bonsai artist.

10 Claims, 3 Drawing Sheets

U.S. Patent  Jan. 4, 1994  Sheet 1 of 3  5,274,952
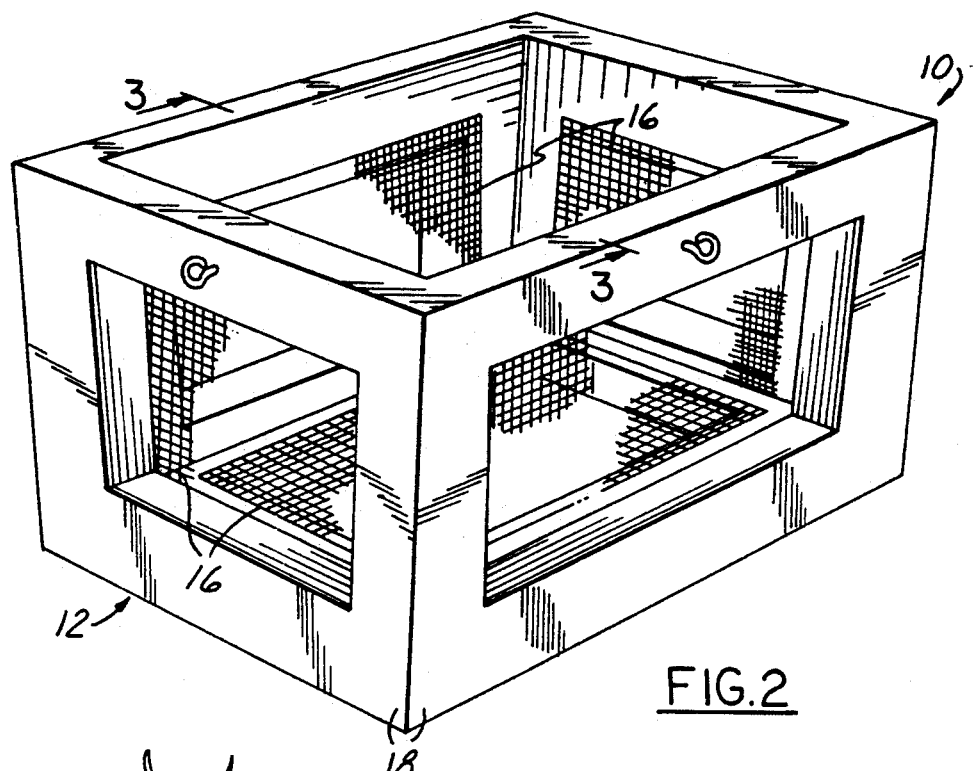
FIG. 2
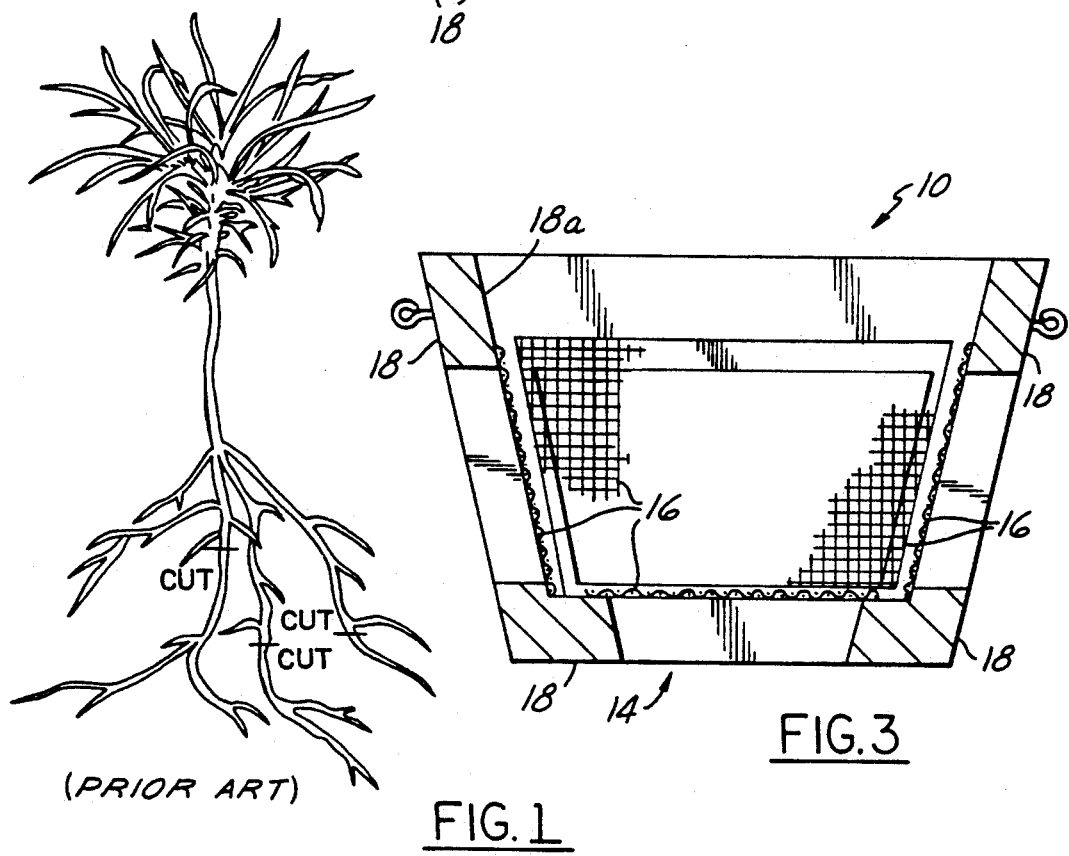
FIG. 1 (PRIOR ART)
FIG. 3

BONSAI TRAINING PLANTER

CROSS-REFERENCE TO RELATED APPLICATIONS

The present application is a Continuation-in-Part application of Ser. No. 07/874,625, filed on Apr. 27, 1992, which application is abandoned.

BACKGROUND OF THE INVENTION

1. Field of the Invention

The present invention relates to bonsai techniques used to train plants to develop a complex system of fine sized feeder roots, and more particularly to a planter structured to interact with a plant so as to cause the plant to automatically develop the desired root system characteristic of bonsai cultivation.

2. Description of the Prior Art:

Bonsai is an art form in which tress, such as pines, are grown in carefully controlled conditions so as to produce an end product in which the tree is of diminutive size suitable for placement in a table-top sized, shallow planter, and yet the plant has a very thick trunk and over-all appearance of an adult, full-sized tree. Because of the artistry and the time consuming, laborious processes involved in the attainment of a completed bonsai, these plants are highly prized and of very great value.

Tree development in nature entails the development of two kinds of roots: dominant roots, which are thick sized for providing anchorage for the tree, and feeder roots, which are fine sized for providing nutrient absorption for the tree from the surrounding soil. Only the feeder roots supply nutrients to the tree. For a tree to develop normally, the soil conditions must favor the development of both the dominant and the feeder roots. If not, such as a tree growing in a rock crevice, normal tree development will not occur. As an example, consider a small sapling planted in a small planter of conventional structure, such as a good-sized flower pot. In this case, the dominant roots will continue to grow by simply wrapping around in the soil of the pot, choking development of the feeder roots. Because the feeder roots are essential to the tree's development, in the end the sapling will grow into a stunted tree having the thin trunk and other characteristics of a sapling; it will never acquire the look of an adult tree, which is uniquely possible with bonsai.

The principle upon which bonsai operates is that a tree will grow in its normal developmental mode as long as soil conditions permit continued normal growth of its root system, and that this may be artificially achieved by adroit periodic pruning of the root system and the limbs. Conventional bonsai practice is as follows (see FIG. 1):

Seeds are tested for viability and then planted in predetermined rows in a soil composed of a sand and top soil mixture; the soil is contained in a planter that is situate in a greenhouse. In time, the seeds will germinate and develop into seedlings. Fertilizer application, watering, pest and weed control and other related steps are taken to promote growth. In spring of the second year, the seedlings are lifted from the soil and the developing dominant roots are pruned as shown in FIG. 1. Thereupon, the seedlings are replanted in mounded rows in a soil of high sand content. During the third year, branch development transpires, which is selectively controlled by pinching off unwanted buds and branch parts. In spring of the fourth year, the seedlings are lifted from the soil and again the dominant roots are pruned. After pruning, the seedlings are replanted into mounds. Normally the seedlings are not subjected to pinching in fourth year, but the branches are selectively pruned so as to encourage a desired tree shape, while promoting a thick trunk development. By spring of the fifth year, the seedlings have become saplings; the saplings are again lifted from the soil and are subjected to selective pruning of the dominant roots. The saplings are now replanted. New buds are pinched and trunk development is usually now quite rapid. Artistic pruning of the limbs ensues in following years with an eye on developing the final bonsai. The final bonsai, having a very complex feeder root system with limited dominant rooting, is placed in a shallow bonsai container where it now provides an artistic expression of the bonsai artist.

The steps outlined hereinabove are calculated to limit dominant root development while maximizing feeder root development. This is based upon the principle that if a dominant root is cut, auxins that normally would develop further dominant root length growth are caused to be sent up the root, causing development of feeder root off-shoots from the remaining portion of the cut dominant root. With the establishment of a very complex feeder root system over time, the plant is able to grow above ground not unlike the way it would in the open ground. In order to control growth above ground, the plant is selectively pruned so as to maximize trunk development and to provide an artistic branch system. Importantly, periodic selective pruning of the dominant roots is essential to the development of the feeder roots; this is known as bonsai training of the plant. Without a complexly developed feeder root system, the plant will not grow a thick trunk and otherwise assume an adult tree appearance.

As can be understood from the foregoing description of bonsai practice, the process of providing a good quality bonsai is very time consuming, excessively laborious and very costly.

Accordingly, what is needed is device which permits bonsai to be provided without all the difficulties present in the conventional practice.

SUMMARY OF THE INVENTION

The present invention is a planter which permits the bonsai artist to train bonsai plant candidates with great facility and extreme ease.

The bonsai training planter according to the present invention is structured in the form of a screen walled plant container. It is preferred that the corners thereof be provided with structural members to which screening is attached. The mesh size of the screening is small enough to hold soil placed within the planter, but large enough to permit roots to grow therethrough. A sheet material having a preselected opacity is spaced from the screening in order to help retain moisture within the soil, and to shield the emerging roots from auxin (root growth hormone) destruction due to direct or intense light.

In operation, a seed or seedling is placed in the soil of the bonsai training planter. As dominant roots grow, they reach the screening and then commence to emerge therefrom between the screening and the sheet material. The portions of the dominant root emerging from the screening dry-out and die. The death of the emergent portion of the dominant root send auxins up the root, thereby inducing feeder root growth along the dominant root. The process continually repeats so as to result in development of a very complex system of feeder roots; the bonsai artist pruning branches in the usual way thereduring. About every three years the plant is lifted from the planter, the soil replaced and the plant replanted into the planter; some root pruning can be done during this replanting process. The plant will develop into a bonsai in minimal time with minimal effort on the part of the bonsai artist.

Accordingly, it is an object of the present invention to provide a planter which automatically truncates dominant roots and encourages growth of feeder roots.

It is another object of the present invention to provide a planter which is structured so as to encourage root auxins and fine root development, while automatically pruning the roots.

It is yet a further object of the present invention to provide a planter which automatically prunes dominant roots via interaction of the roots with a screening wall structure, and yet promotes development of horizontal feeder roots by providing a low light, auxin friendly environment adjacent the screening.

It is an additional object of the present invention to provide a planter suitable for bonsai or other horticultural endeavors, in which the plant planted therein is automatically trained to produce feeder roots at the expense of dominant roots so that the plant may be planted in a small size container and yet have the characteristics of a fully developed adult plant.

These, and additional objects, advantages, features and benefits of the present invention will become apparent from the following specification.

BRIEF DESCRIPTION OF THE DRAWINGS

FIG. 1 is a depiction of the prior art method of bonsai in which the plant is lifted from the soil and then the dominant roots thereof are manually pruned in order to encourage feeder root development.

FIG. 2 is a perspective view of the bonsai training planter according to the present invention.

FIG. 3 is a side view of the bonsai training planter according to the present invention.

DETAILED DESCRIPTION OF THE PREFERRED EMBODIMENT

Figure 4:
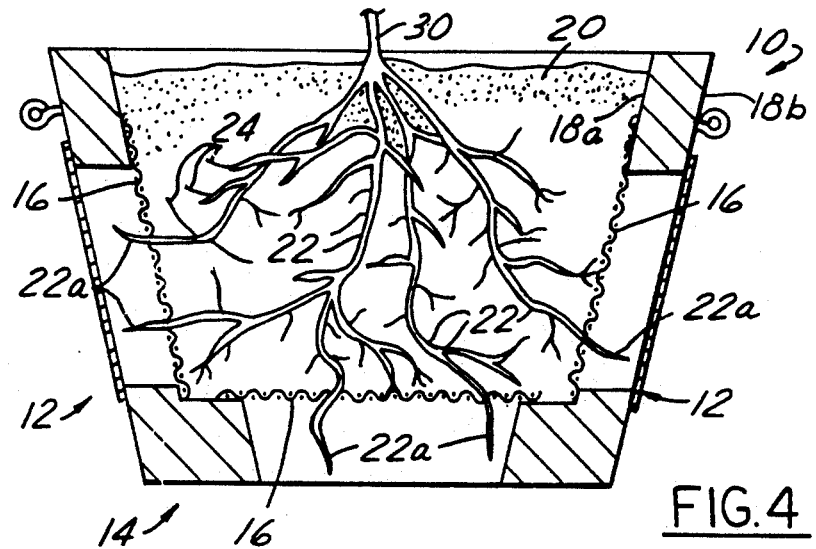
FIGS. 4 through 6 are side views of the bonsai training planter, shown in operation, in which the dominant roots of a plant are progressively caused to be converted into feeder roots.
Figure 5:
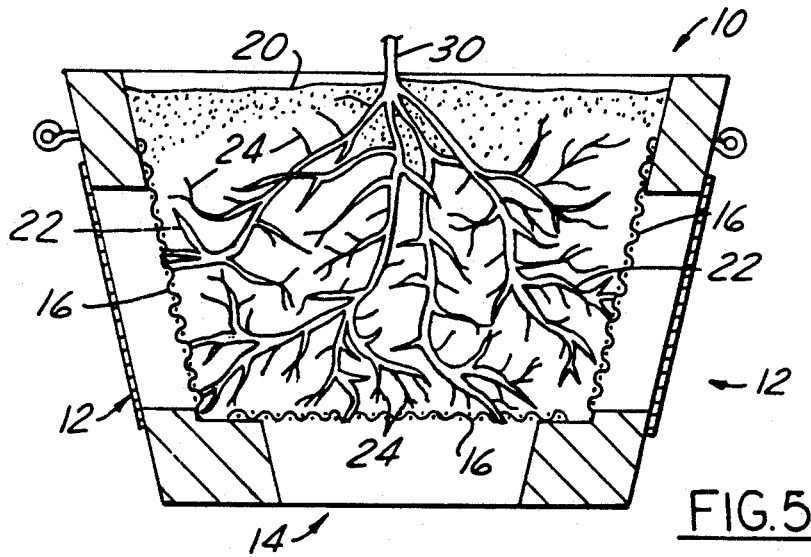
Figure 6:
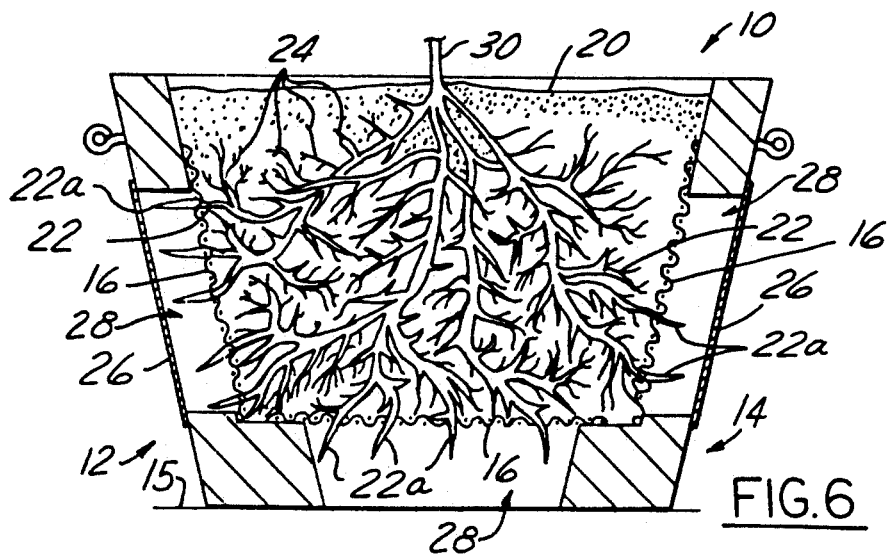

Referring now to the Drawing, FIGS. 2 and 3 show generally the preferred side and bottom component structural aspects of the bonsai training planter 10 according to the present invention. As can be understood from these figures, the bonsai training planter 10 is of a general box-like shape for holding planting soil. The side walls 12 and the bottom wall 14 are substantially defined by screening 16. The side walls 12 and the bottom wall 14 are further defined by corner posts 18 which lend structural integrity to the bonsai training planter 10, and a structure upon which to attach the screening 16. While a box-like shape is preferred, this is not a requirement. A sheet material 26, having a predetermined opacity which is elaborated hereinbelow, is positioned a short distance from the screening at the side walls so as to provide a root emergence zone 28 therebetween. Preferably as shown in FIGS. 4 through 6, the corner posts 18 are of predetermined cross-section so that the screening 16 may be attached to an interior side of the corner posts while the sheet material may be attached to the exterior side of the corner posts, and the space therebetween forms the root emergence zone 28. And, since the bonsai training planter 10 is situated in open air normally siting upon a resting surface 15, the space between the resting surface and the screening at the bottom wall 14, also provides a root emergence zone 28. The root emergence zone 28 provides a selected low light level environment at the screening 16 which encourages root auxins that promote horizontal root growth and also provides a barrier against gross soil moisture loss. The over-all dimensions of the bonsai training planter 10 is predetermined to facilitate rapid root development of a planted plant, and to anticipate the eventual bonsai container shape into which the plant will eventually be placed. Further, while corner posts 18 are preferredfor structural reasons to support the sheet material, they may be optionally omitted where the screening is itself structurally self-supporting and a stand-off support of some sort is provided for the sheet material 26 so as to provide the root emergence zone 28.

In order to fully appreciate the structure and function of the bonsai training planter 10, some discussion of plant physiology and bonsai technique is useful.

Auxins are hormones that react to light and regulate plant growth. Auxins are destroyed by the presence of light. It is the action of auxins and their response to light that cause a plant to appear to grow to the light. However, in actuality the plant is growing more rapidly on the side of the stem away from the light than the side of the stem facing the light. The effect of these two unequally growing opposite surfaces causes the leaf or stem to bend toward the light.

The effect of auxins on root growth has two aspects. The first aspect, known as phototropism, involves the tendency of roots to withdraw in the presence of light. This is caused by the effect of light on root auxins, which are very sensitive to light. The second effect, known as geotropism, involves roots exposed to light tending to grow downwardly.

Accordingly, the bonsai training planter 10 does not only utilize screening on its side walls and bottom wall, but further utilizes a substantially opaque sheet spaced from and adjacent with the screening so as to provide a low light environment at the screening that promotes root auxins and, therefore, prized horizontal root development.

The over-all goal of bonsai can be classified into three categories: one, the development of a root system composed of a preponderance of fine feeder roots for plant vitality in a small planter purposes; two, the only large roots allowed to develop are those that radiate from the base of the trunk on the soil surface for aesthetic purposes; and three, the trunk is encouraged to develop the largest possible diameter which sharply tapers to an apex in the shortest possible distance for aesthetic purposes.

In the prior art, bonsai takes two major growing processes. The first process is to let the tree grow in the ground until the trunk attains the desired diameter. The second process involves periodically digging up the tree, pruning its roots, and replanting the tree so as to eventually adapt the root system to the familiar shallow planters used in bonsai. Ordinarily, ten to twelve years must pass until a saleable quality bonsai is produced via the two processes.

Accordingly, the bonsai training planter 10 is structured to encourage trunk diameter development while at the same time stimulating development of a fine root system of the kind needed for bonsai. As a result, the bonsai training planter 10 is expected to lessen the development time of a saleable bonsai by three to five years.

Now returning to the Drawing, the structure and operation of the bonsai training planter 10 will be further detailed.

At least a substantial proportion of the side walls 12 and bottom wall 14 are defined by the screening 16. The screening 16 has a predetermined mesh size so that soil 20 (see FIGS. 4 though 6) may be placed within the bonsai training planter 10 and preferably not pass therethrough; however, as a practical matter some soil will inevitably pass through the mesh openings of the screening 16, so that what is desired is for only a fraction of the soil to pass through the mesh openings under normal conditions of operation. The mesh size of the screening 16 is further predetermined to provide automatic root truncation in the manner to be described hereinbelow.

A preferred material for the corner posts 18 is wood, in which adjacent corner posts are interconnected by screws, but other materials, such as plastic, can be substituted. The preferred screening 16 is common plastic or aluminum insect screen. The screening 16 is preferred to be located adjacent the interior side 18a of the corner posts 18, and to be attached thereto by stapling.

Figure 10:
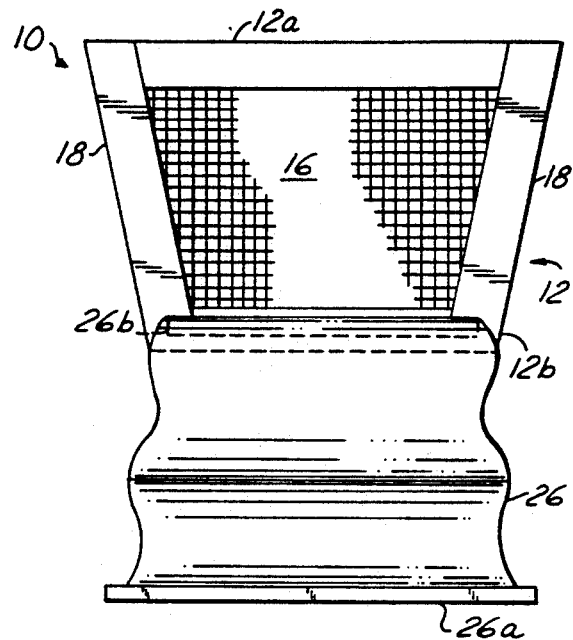
FIG. 10 is a side view of a bonsai training planter according to the present invention showing a preferred form of an opaque sheet material for selectively covering the screening of the walls of the bonsai training planter, shown in a non-covering mode of operation.
Figure 11:
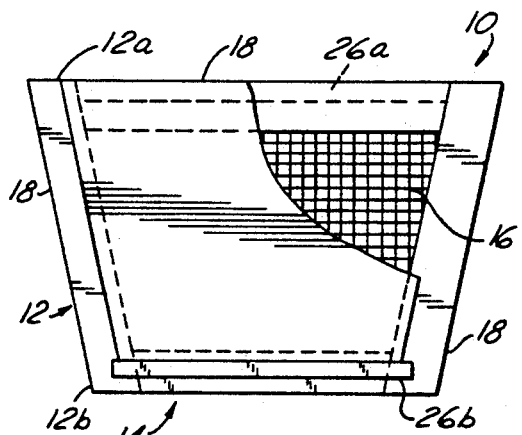
FIG. 11 is a side view of a bonsai training planter according to the present invention showing a preferred form of an opaque sheet material for selectively covering the screening of the walls of the bonsai training planter, shown in a covering mode of operation.

FIGS. 4 through 6 show the sheet material stapled to the exterior side 18b of the adjacent corner posts 18. However, the preferred mode of attachment of the sheet material 26 is shown in FIGS. 10 and 11. The sheet material 26 is placed over the screening 16 at the exterior side 18b of the corner posts 18 and the bottom end 26b of the sheet material 26 is stapled or otherwise attached to the adjacent corner posts 18 at the lower end 12b of the adjacent side wall 12. A weighted top end 26a of the sheet material 26 is draped over the corner post 18 at the upper end 12a adjacent the side wall 12, as particularly shown in FIG. 11. The sheet material 26 may be flexed or rolled out of the way from time to time (as shown in FIG. 10) so that the bonsai artist can gain access to the screening 16 for purposes of soil and root inspection or for manual pruning of emergent root parts 22a. The sheet material 26 (and the resting surface 15) is spaced from the screening 16 a distance at least equal to the length of the emergent root parts 22a so as not to interfere with the automatic air pruning process. That is, growth of the roots through the screening proceeds to a maximum average root length in air and then stops by an air pruning process in which the emergent root parts dry-out and die. The root emergence zone 28 thereby formed between the screening 16 and the sheet material 26 provides a low light environment that favors root auxin production so that roots tend to grow horizontally out the screening to thereupon become air pruned. Without the sheet material light would influence the roots to grow downwardly, thereby encouraging a root distribution that is not constant with the aims of bonsai: a compact, dense, fine root system. Preferred materials for the sheet material 26 include any opaque or substantially opaque materials such as anti-weed porous landscape fiberglass sheet, plastic sheeting (preferably black), burlap, or heavy curtain; the sheet material 26 is preferred to be flexible, but this is not a requirement. The bottom wall 14 does not require coverage by the sheet material 26, as it is ordinarily denied light exposure when placed upon the resting surface 15, the root emergence chamber 28 being defined between the resting surface and the screening 16. However, should the bonsai training planter 10 be suspended rather than be resting upon a surface 15, then the sheet material would be placed over the bottom wall 14 in the manner of the side walls 12.

Figure 7:
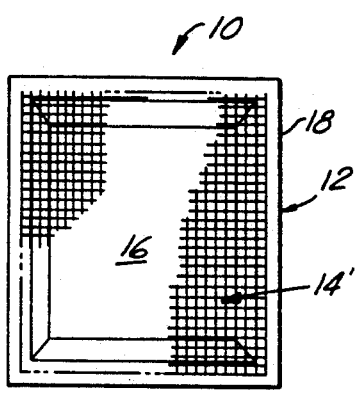
FIG. 7 is a top plan view of the bonsai training planter according to the present invention, shown having a removable bottom wall.
Figure 8:
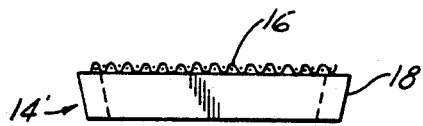
FIG. 8 is a side view of the removable bottom wall of the bonsai training planter shown in FIG. 7.
Figure 9:
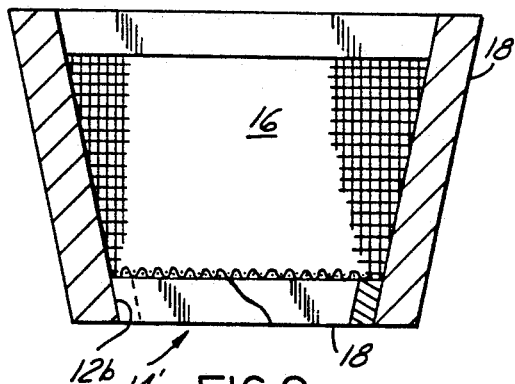
FIG. 9 is a side view of the bonsai training planter according to the present invention, shown having a removable bottom wall.

FIGS. 7, 8 and 9 show a preferred structure of the bonsai training planter 10 for providing easy removal of a plant therefrom. The bottom wall 14 is in the form of a removable bottom wall 14' which is structured so as to be selectively separable from the lower end 12b of the side walls 12. The removable bottom wall 14' is shown in FIG. 9 being removably held in place with respect to the side walls 12 by a wedging action with respect to the adjoining corner posts 18 of the side walls 12. Other structures to removably hold the removable bottom wall 14' in place with respect to the side walls 12 can be used, such as tabs or the like, so long as the removable bottom wall cannot fall out and the removable bottom wall can be lifted up out of the space defined by the side walls so as to take the plant, its roots and the soil in one package out of the bonsai training planter 10. Of course, the removable bottom wall 14' can be placed in its operational position as shown in FIG. 9 without any structure to hold it in place with respect to the side walls 12 so long as there is assurance that the bonsai training planter will not be accidentally picked up (lest the removable bottom wall be disastrously left behind on the resting surface).

The method of operation will now be detailed, with reference being had in particular to FIGS. 4 through 6.

As can be understood from FIG. 4, soil 20 is placed within the bonsai training planter 10 and a seedling or seed planted into the soil. The bonsai training planter 10 is placed on a resting surface 15, and the screening 16 is exposed to air. Eventually, the seedling 30 develops roots including dominant roots 22 and feeder roots 24. The dominant roots grow to, through and beyond the screening 16, so that an emergent root part 22a exists into the air exterior to the soil 20.

As can be understood from FIG. 5, the emergent root parts 22a dry-out and die, thereby causing auxins to travel up the dominant root 22 which thereby encourage development of feeder roots 24. The emergent root parts 22a eventually fall off, or they may be rubbed off by the bonsai artist. Because of the darkened root emergence zone 28, horizontal root growth is continually encouraged by auxin production even though air pruning due to the screening is ensuing.

As can be understood from FIG. 6, other dominant roots 22 reach the screening 16 and have emergent root parts 22a which dry-out and die, thereby encouraging even more feeder roots 24 to develop from the dominant roots 22.

Thus, according to the present invention, a seedling which naturally produces dominant roots and feeder roots is caused to automatically limit growth of its dominant roots and encourage growth of its feeder roots without need of the seedling to be lifted from the soil for manual root pruning. As a result, the plant will not suffer from the shock of repeated replanting and will benefit from a continuous root pruning process that encourages a maximal growth rate because of the fast development of feeder roots. Accordingly, the entire bonsai process is sped-up, yet virtually no labor is involved.

Every three years or so, it is preferred to replant the plant into new soil, and at that time any manual root pruning can be carried out, if desired. In order to facilitate this process the removable bottom wall 14' is preferred. Upon the conclusion of bonsai training, the plant is ready for final replanting in its bonsai planter.

The soil 20 is periodically watered, fertilized, and otherwise serviced in a horticulturally responsible manner. Moisture loss from the soil through the mesh openings of the screening 16 is allayed by the sheet material 26.

It is to be understood that the method of operation of the bonsai training planter 10 is different from simply planting a plant in a conventional planter. With regard to the conventional planter, the dominant roots will keep growing unchecked in a manner which stifles the feeder roots. However, with regard to the bonsai training planter 10, emergent root parts 22a can grow only to a maximum average length and then are automatically truncated by operation of air pruning in which the emergent root parts dry-out and die upon passage through the screening; this air pruning causes production of auxins which stimulate development of feeder roots. Importantly, since a darkened root emergence zone is provided adjacent the screening, root auxins are encouraged to produce horizontal root growth, as would happen if the plant were located in the ground.

It is to be further understood that the bonsai training planter 10 may be used for horticultural activities other than bonsai. For instance, an apartment renter can train one or more corn plants to grow in a small planter located in his or her living space or on his or her balcony, and yet produce normal sized vegetables. This would not be possible using a conventional planter because the dominant roots would choke-off development of the feeder roots, which are necessary for vegetable production.

To those skilled in the art to which this invention appertains, the above described preferred embodiment may be subject to change or modification. In this regard, it is to be understood that more than one plant may be grown in the bonsai training planter simultaneously with the roots of each developing as outlined hereinabove. Further, while a four-sided side walled bonsai training planter is shown in the Drawing, the shape may be otherwise and have a corresponding number of side walls. For example, if the bonsai training planter is round, then it would have a singular side wall 12 of more or less cylindrical or frustoconical shape. Such change or modification can be carried out without departing from the scope of the invention, which is intended to be limited only by the scope of the appended claims.

What is claimed is:

1. A bonsai training planter structured for being used in a surrounding air environment for retaining therein planting soil into which one or more plants are grown, said bonsai training planter comprising:
    at least one side wall comprising screening having a mesh size which substantially retains the soil from passing therethrough and which further permits roots of the one or more plants to grow therethrough becoming emergent root parts, said at least one side wall having an upper end and a lower end;
    a bottom wall adjoining said lower end of said at least one side wall, said bottom wall comprising screening having a mesh size which substantially retains the soil from passing therethrough and which further permits roots of the one or more plants to grow therethrough becoming emergent root parts, said at least one side wall and said bottom wall collectively forming a planter for holding the soil; and
    low light means for providing a predetermined level of light at said at least one side wall and said bottom wall screening;
    wherein growth of the roots through said screening proceeds to a maximum average root length and then stops by an air pruning process.

2. The bonsai training planter of claim 1, wherein said low light means comprises:
    a sheet material of preselected opacity spaced a predetermined distance from said screening of said at least one side wall so as, to provide a root emergence zone therebetween having said predetermined light level; and
    means for supporting said sheet material at said predetermined distance from said at least one side wall.

3. The bonsai training planter of claim 2, wherein said at least one side wall comprises at least three side walls, and said means for supporting said sheet material in relation to said at least three side walls comprises corner post means for providing structural strength and definition to said at least three side walls and said bottom wall, said corner post means having an interior side and an exterior side separated from each other by said predetermined distance, said screening of said at least three side walls and said bottom wall being connected to said interior side of said corner post means, said sheet material being connected to said exterior side of said corner post means.

4. The bonsai training planter of claim 3, wherein said corner post means comprises a plurality of mutually interconnected wooden members.

5. The bonsai training planter of claim 3, wherein said corner post means is structured so that said bottom wall is selectively removable from said lower end of said at least three side walls by lifting said bottom wall toward said upper end of said at least three side walls.

6. The bonsai training planter of claim 5, further comprising means for selectively holding said bottom wall in adjoinment with said lower end of said at least three side walls.

7. The bonsai training planter of claim 3, wherein said sheet material comprises a plurality of discrete portions, each discrete portion of said plurality of discrete portions respectively covering each side wall of said at least three side walls each said discrete portion having a bottom end and a top end, wherein for each said discrete portion, said bottom thereof is connected with said lower end of its respective side wall and said top end thereof is weighted for draping over sid upper end of its respective side wall.

8. The bonsai training planter of claim 7, wherein said corner post means is structured so that said bottom wall is selectively removable from said lower end of said at least three side walls by lifting said bottom wall toward said upper end of said at least three side walls.

9. The bonsai training planter of claim 8, further comprising means for selectively holding said bottom wall in adjoinment with said lower end of said at least three side walls.

10. A method for training a growing plant to produce a complex feeder root system with a limited dominant root system of the kind produced using bonsai horticultural technique, said method comprising the steps of:

providing a predetermined volume of soil;

planting at least one of a seed and a seedling into the soil;

providing horticultural maintenance of said at least one of said seed and said seedling so that said at least one of said seed and said seedling becomes at least one growing plant having roots located within the predetermined volume of soil;

permitting the roots to grow in the soil and to continue to grow outside the predetermined volume of soil;

exposing the roots growing outside the predetermined volume of soil to air to thereby cause the roots growing outside the predetermined volume of soil to dry-out and die and thereby produce auxins which induce formation of feeder roots along at least a portion of the roots located within the predetermined volume of soil; and simultaneously with said step of exposing, providing a controlled low light environment within a predetermined space outside the predetermined volume of soil which encourages said auxin production.

* * * * *